United States Patent
Kudsk

(10) Patent No.: US 11,933,264 B2
(45) Date of Patent: Mar. 19, 2024

(54) METHOD OF MANUFACTURING A WIND TURBINE BLADE AND WIND TURBINE BLADE

(71) Applicant: Vestas Wind Systems A/S, Aarhus (DK)

(72) Inventor: Henrik Kudsk, Harlev (DK)

(73) Assignee: Vestas Wind Systems A/S, Aarhus (DK)

(*) Notice: Subject to any disclaimer, the term of this patent is extended or adjusted under 35 U.S.C. 154(b) by 337 days.

(21) Appl. No.: 17/408,795

(22) Filed: Aug. 23, 2021

(65) Prior Publication Data

US 2021/0381485 A1  Dec. 9, 2021

Related U.S. Application Data

(62) Division of application No. 15/779,297, filed as application No. PCT/DK2016/050401 on Nov. 29, 2016, now Pat. No. 11,125,206.

(30) Foreign Application Priority Data

Nov. 30, 2015 (DK) .................................. 2015 70780

(51) Int. Cl.
*F03D 1/06* (2006.01)
*B29C 64/00* (2017.01)
(Continued)

(52) U.S. Cl.
CPC ............ *F03D 1/0675* (2013.01); *B29C 64/00* (2017.08); *B33Y 10/00* (2014.12); *B33Y 80/00* (2014.12);
(Continued)

(58) Field of Classification Search
CPC ....... F03D 1/0675; B33Y 10/00; B33Y 80/00; F05B 2230/00; F05B 2230/30; B29C 64/10; Y02P 70/50; Y02E 10/72
See application file for complete search history.

(56) References Cited

U.S. PATENT DOCUMENTS

| | | | |
|---|---|---|---|
| 2,326,430 A | 8/1943 | Blanchard | |
| 3,273,833 A * | 9/1966 | Windecker | ............... B64C 3/26 416/223 R |

(Continued)

FOREIGN PATENT DOCUMENTS

| | | |
|---|---|---|
| EP | 2735731 A1 | 5/2014 |
| EP | 2915996 A1 | 9/2015 |

(Continued)

OTHER PUBLICATIONS

Xingxing Lu, "Accurate detection of porosity in glass fiber reinforced polymers by terahertz spectroscopy", Aug. 1, 2022, Composites Part B: Engineering, vol. 242 (Year: 2022).*

(Continued)

*Primary Examiner* — Eric J Zamora Alvarez
*Assistant Examiner* — Theodore C Ribadeneyra
(74) *Attorney, Agent, or Firm* — Wood Herron & Evans LLP

(57) ABSTRACT

A wind turbine blade includes a lengthwise portion that extends between a root region and a tip region of the wind turbine blade. The lengthwise portion includes a cross section in which a first region surrounds a second region. The densities of the first and second regions vary with the first density being greater than the second density. The lengthwise portion includes a surface layer that bounds the first region, forms an exterior surface, and is configured to resist environmental degradation. At least one structural element extends longitudinally through the first region and is configured to reinforce the blade during use of the wind (Continued)

turbine. The lengthwise portion of a wind turbine blade may be made through an additive manufacturing process by depositing a main body in a plurality of layers. Each layer may be deposited in a plane generally parallel to a longitudinal axis of the lengthwise portion.

20 Claims, 6 Drawing Sheets

(51) Int. Cl.
*B33Y 10/00* (2015.01)
*B33Y 80/00* (2015.01)
*B29C 64/10* (2017.01)

(52) U.S. Cl.
CPC ........... *B29C 64/10* (2017.08); *F05B 2230/00* (2013.01); *F05B 2230/30* (2013.01); *Y02E 10/72* (2013.01); *Y02P 70/50* (2015.11)

(56) References Cited

U.S. PATENT DOCUMENTS

| | | | |
|---|---|---|---|
| 7,855,250 B2 | 12/2010 | Ui et al. | |
| 8,662,853 B2 | 3/2014 | Vasudeva et al. | |
| 9,500,179 B2* | 11/2016 | Arendt | F03D 1/0675 |
| 9,951,751 B2* | 4/2018 | Yarbrough | F03D 1/0675 |
| 10,018,175 B2 | 7/2018 | Marcoe et al. | |
| 10,113,532 B2 | 10/2018 | Riahi et al. | |
| 10,487,797 B2 | 11/2019 | Hancock et al. | |
| 10,830,206 B2 | 11/2020 | Tobin et al. | |
| 10,865,769 B2 | 12/2020 | Tobin et al. | |
| 2007/0251090 A1* | 11/2007 | Breugel | B32B 27/04 |
| | | | 29/889.7 |
| 2009/0083960 A1* | 4/2009 | Holland | F01D 5/005 |
| | | | 29/402.02 |
| 2010/0135816 A1* | 6/2010 | Cairo | F03D 1/0675 |
| | | | 87/8 |
| 2010/0143148 A1* | 6/2010 | Chen | F03D 1/0675 |
| | | | 416/223 R |
| 2010/0260612 A1* | 10/2010 | Vasudeva | F03D 1/0675 |
| | | | 29/889.71 |
| 2011/0031759 A1 | 2/2011 | Mitsuoka et al. | |
| 2011/0123343 A1 | 5/2011 | Ronner | |
| 2011/0135487 A1 | 6/2011 | Rao et al. | |
| 2011/0150661 A1 | 6/2011 | Robbins et al. | |
| 2014/0322023 A1 | 10/2014 | Tapia | |
| 2015/0252779 A1* | 9/2015 | Sievers | F03D 1/0675 |
| | | | 416/229 R |
| 2015/0330231 A1 | 11/2015 | McGuire et al. | |
| 2017/0120336 A1 | 5/2017 | DeMuth et al. | |
| 2018/0037000 A1 | 2/2018 | Church | |
| 2018/0044002 A1 | 2/2018 | Cotton et al. | |
| 2018/0311927 A1 | 11/2018 | Tyan | |
| 2019/0032491 A1 | 1/2019 | Nissen et al. | |
| 2019/0152165 A1 | 5/2019 | Tobin et al. | |
| 2019/0152168 A1 | 5/2019 | Tobin et al. | |
| 2019/0153995 A1 | 5/2019 | Tobin et al. | |
| 2019/0153996 A1 | 5/2019 | Tobin et al. | |
| 2019/0293048 A1 | 9/2019 | Roberts et al. | |

FOREIGN PATENT DOCUMENTS

| | | | | |
|---|---|---|---|---|
| GB | 2569571 A | | 6/2019 | |
| KR | 20130096867 A | * | 9/2013 | ........... F03D 1/0675 |
| WO | 2011066279 A2 | | 6/2011 | |
| WO | 2013178228 A1 | | 12/2013 | |

OTHER PUBLICATIONS

Eun-Suk Jang, "Porosity analysis of three types of balsa (*Ochroma pyramidale*) wood depending on density", May 26, 2022, Journal of Wood Science, vol. 68 (Year: 2022).*
Danish Patent and Trademark Office, Search and Examination Report in PA 2015 70780, dated Jul. 15, 2016.
European Patent Office, International Search Report and Written Opinion in PCT/DK2016/050401, dated Feb. 17, 2017.

* cited by examiner

METHOD OF MANUFACTURING A WIND TURBINE BLADE AND WIND TURBINE BLADE

CROSS REFERENCE TO RELATED APPLICATIONS

This application is a divisional of U.S. patent application Ser. No. 15/779,297, filed May 25, 2018 (pending), which is a U.S. National Phase Application of PCT Application No. PCT/DK2016/050401, filed Nov. 29, 2016 (expired), which claimed the priority to Danish Application No. PA 2015 70780, filed Nov. 30, 2015, the disclosures of which are incorporated by reference herein in their entirety.

TECHNICAL FIELD

The present invention relates generally to wind turbines, and more particularly to wind turbine blades for use on wind turbines and methods and systems for manufacturing wind turbine blades.

BACKGROUND

Wind turbines are used to produce electrical energy using a renewable resource and without combusting a fossil fuel. Generally, a wind turbine converts kinetic energy into mechanical energy and then subsequently converts the mechanical energy into electrical energy. A horizontal-axis wind turbine includes a tower, a nacelle located at the apex of the tower, and a rotor that is supported in the nacelle. The rotor is coupled either directly or indirectly with a generator, which is housed inside the nacelle. The rotor includes a central hub and a plurality of blades (e.g., three blades) mounted thereto and that extend radially therefrom.

A wind turbine blade is a complex structure that must be constructed to withstand long term service in an abusive environment. To that end, wind turbine blades must satisfy several design criteria. In this regard, to produce electrical energy, the blade must have a shape that interacts with wind to produce lift while minimizing drag. Lift allows the blade to rotate the hub when acted upon by the wind. The blade must also support itself under gravity, under wind loading, and under other dynamic loading as the wind turbine blade rotates the hub. The surface of the blade needs to resist degradation for as long as possible when exposed to abrasive wear, to UV radiation, and to other harsh environmental conditions.

In view of these criteria, the massive wind turbine blades are complex structures. Wind turbine blades are often constructed of a shell, spar caps, and one or more shear webs. The shell is typically a layered composite that forms the exterior surface of the blade and thus encloses the shear webs and spar caps, which enables the shell to resist flap and edgewise loading during use of the blade. The shell is therefore exposed to the environment and is shaped to produce the lift needed to rotate the hub. Conventional wind turbine blades are currently manufactured by a manually intensive production process. In addition, production of large wind turbine blades requires a large amount of capital in the form of large facilities and mold making equipment. In one such process, two large-scale molds must first be produced. The molds define the external shape of the wind turbine blade. Each mold forms approximately one half of the shell.

Once the molds are manufactured, a laminate structure that forms the shell of the wind turbine blade is produced from each mold by placing a fiber-resin composite in the mold. A process that may include vacuum infusion may be utilized to infuse a fabric, such as a glass or carbon fiber fabric, with resin in the mold. Robots and other automation may be used to assist in this process and to reduce the otherwise manually intensive process of laying up the molds. The resin is then cured.

The cured fiber-resin composite structure conforms to the mold surface to form one-half of the shell of the wind turbine blade. The shells may be stiffened by inserting a core of foam or balsa wood where needed. With the aid of cranes, the two shell halves are extracted from their respective molds and are bonded together. Once bonded, the blades are finished. Because it is a manual process, variation from blade to blade may be significant and defects, such as delamination, can occur. Once finished, the large wind turbine blades are transported from the manufacturing facility to the installation site, which may be hundreds to thousands of kilometers away.

By this process, a strong shell is produced. The shell is designed to satisfy each of the several design criteria. That is, it is shaped to provide lift, it is made of a material that significantly resists environmental degradation, and even though it may be structurally reinforced by the spar caps/shear webs, the shell has strength and thus is at least somewhat self-supporting. But this strong shell design may not optimal. By way of example, the properties of the blade cannot be varied along the blade's length. This is because the molding process constrains desirable variation. As a result, the blade is constructed with more material in the shell than is necessary to ensure that the blade is stronger than is necessary. Even though more desirable designs may be available, conventional molding techniques thus inhibit adoption of those designs.

Accordingly, there is a need for improved wind turbine blades and methods and systems for manufacturing wind turbine blades that permit variation in the structure of the turbine blade while also improving resistance to environmental degradation.

SUMMARY

To address these and other drawbacks, a wind turbine blade includes at least one lengthwise portion that extends between a root region including a root end and the tip region including a tip of the wind turbine blade. The lengthwise portion includes a cross section in which a first region of a first density surrounds a second region of a second density. The second region includes a volume of void space such that the second density is less than the first density. Furthermore, the density of the lengthwise portion may vary from a maximum density at or near an exterior surface of the wind turbine blade to a minimum density at or near the core of the lengthwise portion. This configuration may improve the structural strength of the wind turbine blade. In that regard, the first region may include a first volume of void space and the second region may include a second volume of void space greater than the first volume of void space. In one embodiment, the void space may be formed by a honeycomb structure. In one embodiment, the void space may be formed by a porous structure. The lengthwise portion includes a surface layer that bounds the first region, forms an exterior surface of the wind turbine blade, and is configured to resist environmental degradation. In one embodiment, the lengthwise portion extends from the root region into at least the mid span region. In addition or alternatively, the lengthwise portion may extend to the tip, and in the tip region, the lengthwise portion lacks the second region.

In accordance with one embodiment, a wind turbine includes a tower, a nacelle disposed adjacent a top of the tower, and a rotor including a hub and at least one wind turbine blade including at least one lengthwise portion as described herein extending from the hub.

In one embodiment, the wind turbine blade includes at least one structural element that extends longitudinally through the first region and that is configured to reinforce the blade under load during use of the wind turbine. In this regard, the first region may include a recess and the structural element may be coupled to the first region in the recess. The cross section of the lengthwise portion may further include a third region of a third density in which case the second region may surround the third region. Following the general trend for variation in density, the second density is greater than the third density.

In an aspect of the invention, the lengthwise portion of a wind turbine blade may be made through an additive manufacturing process. In that regard, the lengthwise portion may be made by depositing a main body in a plurality of layers such that a cross section of the main body includes the first region surrounding the second region. The first and second regions are of different density with the second region including a volume of void space that is greater than the void space, if any, in the first region. The void space may be defined by a honeycomb structure or by a plurality of pores in a porous structure. Each layer may be deposited in a plane generally parallel to a longitudinal axis of the lengthwise portion. According to the additive manufacturing process, the material of the first region may be the same as the material of the second region. During the additive manufacturing process, the layers may be built around the structural elements. Alternatively, recesses may be built into the main body and a structural element may then be inserted into a corresponding recess following construction of the main body.

If the main body is not constructed on a film, which may later form the surface layer of the wind turbine blade, in one embodiment, the surface layer is formed by inserting the main body into an envelope and shrinking (e.g., by heating) the envelope onto the main body. In one embodiment, the method includes producing digital data defining a three-dimensional model of the wind turbine blade. A material is deposited to form the lengthwise portion of the wind turbine blade based on the digital data. In particular, the plurality of layers is deposited in accordance with the digital data, layer by layer. Each layer of the material is in the shape of a two-dimensional cross section of the three-dimensional model. The layers are stacked in a third dimension to define the first region and the second region extending the length of the lengthwise portion.

BRIEF DESCRIPTION OF THE DRAWINGS

The accompanying drawings, which are incorporated in and constitute a part of this specification, illustrate embodiments of the invention and together with the detailed description given below, serve to explain various aspects of the invention.

DETAILED DESCRIPTION

Figure 1:
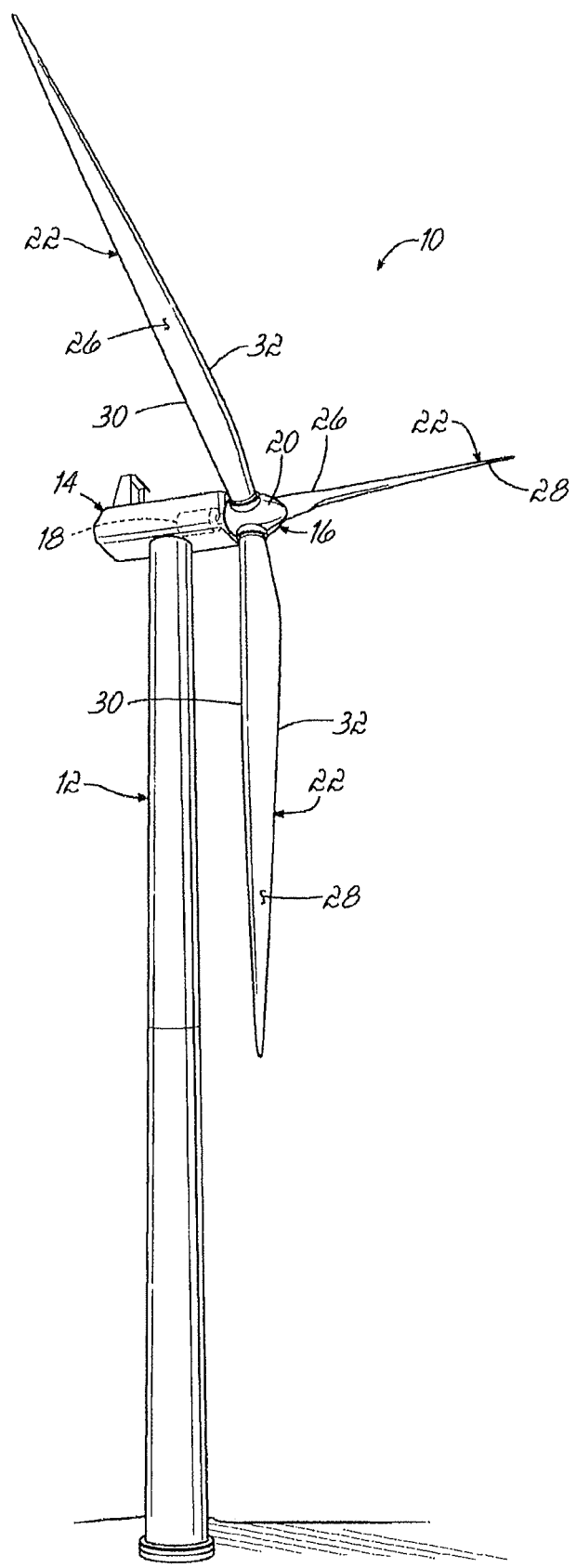
FIG. 1 is a perspective view of a wind turbine according to one embodiment of the invention.

With reference to FIG. 1, in an exemplary embodiment of the invention, a wind turbine 10 includes a tower 12, a nacelle 14 disposed at the apex of the tower 12, and a rotor 16 operatively coupled to a generator 18 housed inside the nacelle 14. The rotor 16 of the wind turbine 10 includes a central hub 20 and a plurality of wind turbine blades 22 that project outwardly from the central hub 20 at locations circumferentially distributed around the hub 20. As shown, the rotor 16 includes three wind turbine blades 22, but the number of blades may vary from one wind turbine to another. The wind turbine blades 22 are configured to interact with air flow to produce lift that causes the rotor 16 to spin generally within a plane defined by the wind turbine blades 22.

According to embodiments of the invention, one or more of the wind turbine blades 22 (or lengthwise portions thereof) may be manufactured according to an additive manufacturing technique. By way of example only, and not limitation, the wind turbine blades 22 may be produced by a layering process, such as VAT photopolymerization, stereolithography (SL), digital light processing (DLP), selective laser sintering (SLS), selective laser melting (SLM), electron beam melting (EBM), binder jetting, material jetting, direct metal layer sintering (DMLS), or fused deposition modeling (FDM), to name only a few. These processes utilize computer controlled deposition of individual layers of material based on a computer model of a part.

The computer model is divided into model layers. Each model layer may then be reproduced by depositing a layer of material from a 3-D printer. The individual model layers may be deposited from a powder or from a ribbon of extruded material, for example. The deposited layers are based on discrete cross sections of the model as determined by slicing the model into a finite number of individual model layers. By depositing each layer, one deposited layer on a preceding deposited layer, the computer model of the part is used to construct a real part. These 3-D printing processes may utilize various materials including thermoplastics, thermosetting resins, metals, and combinations thereof, and other materials. Additive manufacturing of the blades eliminates the necessity, lead time, and expense of large molds. According to embodiments of the present invention, because the wind turbine blades are produced from an essentially mold-less process, changes in the wind turbine blade design may be incorporated quickly and easily. In addition, advantageously, wind turbine blades may be manufactured at the installation site of the wind turbine thus eliminating problems associated with transportation of the blades.

In this regard, as is described below, the wind turbine blade 22 or a lengthwise portion 24 thereof may be manufactured by depositing one layer at a time as determined by a three-dimensional computer model of the wind turbine blade 22. By the additive manufacturing process, the density of the material may be varied generally from at or near the exterior surface of the wind turbine blade 22 to the center or core of the wind turbine blade 22. In addition, the density of the material varies along the length of the lengthwise portion 24. Thus, in one embodiment, the density is varied in three dimensions—along the length and the width and the height (i.e., the cross section) of the wind turbine blade 22. It will be appreciated that the lengthwise portion 24 may extend the full length of the wind turbine blade 22 and so the density may vary along the full length of the wind turbine blade 22.

In general, with regard to density variations in the cross section, the density of the material is relatively high at or near the exterior surface of the wind turbine blade 22. From a high density outer region, the density decreases toward a core of the wind turbine blade 22. This density variation across the cross section of the wind turbine blade 22 from the exterior surface to the core is very much like the density variation in bones and so cross sections of the wind turbine blade 22 according to embodiments of the invention may appear to be bone-like. Advantageously, the density variation strengthens the wind turbine blade 22 while reducing its weight.

To these and other ends, the density variation may be accomplished by an additive manufacturing technique which permits building of different amounts of void space within a pre-defined structure. The void space is controlled through the cross section of the lengthwise portion 24 and along the length of the lengthwise portion 24. While the density variations are described below with regard to FIGS. 3A-5B, in general, the ratio of the volume of material of the pre-defined structure to the volume of the void space determines the density. As the ratio is reduced, there is less material and more void space per unit volume of the region and the density of the region is therefore reduced. Similarly, as the ratio is increased, there is more material and less void space per unit volume and the density is therefore increased. This ratio is varied across the cross section of the wind turbine blade 22 as well as being varied along at least the length of the lengthwise portion 24 of the wind turbine blade 22.

In one embodiment and by way of example only, a honeycomb structure may be built to encapsulate a predetermined volume of void space. The honeycomb structure may change in size along the cross section of the lengthwise portion. As the size of the honeycomb structure is changed, the volume of the void space encapsulated by the structure may be changed. This may be achieved by changing the thickness of the walls of the honeycomb structure, for example. In one embodiment, the honeycomb structure is enlarged while the wall thickness of the honeycomb structure is constant. This construction encapsulates more void space in each honeycomb and reduces the density of the region. The relative enlargement of the void space at constant wall thickness may increase from an exterior surface of the lengthwise portion toward a centroid of the cross section of the lengthwise portion. In this case, the volume of material of the honeycomb structure is decreased (i.e., because the wall thickness of the honeycomb structure is constant) while the volume of void space increases. Thus, the density is generally reduced from the exterior surface toward the center of the wind turbine blade.

In one embodiment, a similar density variation may be achieved by depositing material and controlling the porosity of that material. In contrast to the honeycomb structure, which may be intentionally constructed to a specific size, pore structure may be more random and naturally occurring, though certain aspects of the pore structure are controlled to provide density variation. That is, the void space is controlled through control of the volume of porosity per unit volume of deposited material. The volume of pores in the material may be varied across the cross section from very little or no porosity at or near an exterior surface of the lengthwise portion 24 to a large percentage of porosity at or near the center of the lengthwise portion 24. By way of example, the volume of porosity may be controlled by changing the size of the pores. Where the average pore size is reduced and the number of pores per unit volume is essentially maintained, the density of the region will increase. Thus, in one embodiment, the pore size may increase from at or near the exterior surface of the lengthwise portion 24 toward the center of the lengthwise portion 24. As an alternative, the volume of porosity may be controlled by maintaining the pore size but increasing the number of pores per unit volume of material. It will be appreciated that controlling a combination of pore size and pore number per unit volume may produce the density variation along the cross section and along the length of the lengthwise portion 24.

The material of the pre-defined structure may be a thermoplastic, such as acrylonitrile butadiene styrene (ABS); a polyamide, like nylon; poly(methyl methacrylate) (PMMA); polylactic acid (PLA); polycarbonate (PC); polyethylene (PE); polypropylene (PP); polyvinyl chloride (PVC); and polyether sulfone (PES), among others. In one embodiment, the structure may be made of recycled plastic materials. In addition, or in the alternative, a variety of thermoset materials may be utilized.

With continued reference to FIG. 1, in addition to the generator 18, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14 and also operates to elevate the nacelle 14 and rotor 16 to a height above ground level or sea level, as the case may be, at which faster moving air currents of lower turbulence are typically found. The rotor 16 of the wind turbine 10, which is represented as a horizontal-axis wind turbine, serves as the prime mover for the electromechanical system. Wind exceeding a minimum level will activate the rotor 16 and cause rotation in a substantially perpendicular direction to the wind direction. This rotation activates the generator 18 which then produces electrical energy.

The wind turbine 10 may be included among a collection of similar wind turbines belonging to a wind farm or wind park (not shown) that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities.

Under normal circumstances, the electrical energy is supplied from the generator 18 to the power grid as known in the art.

Figure 2:
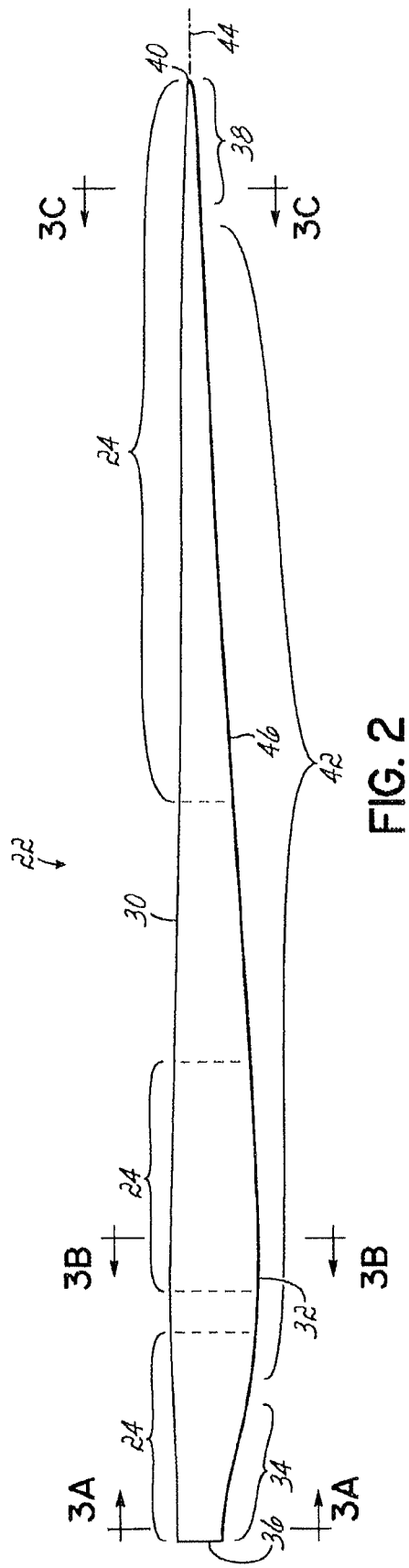
FIG. 2 is a plan view of a wind turbine blade of FIG. 1 according to one embodiment of the invention.

With reference to FIGS. 1 and 2, air flowing over the wind turbine blades 22 produces lift between a suction surface 26 and a pressure surface 28 of the wind turbine blades 22 to cause the rotor 16 to rotate. As is understood in fluid dynamics, air flowing over the wind turbine blade 22 forms a boundary layer that may separate from the outer surface of the wind turbine blade 22 between a leading edge 30 of the wind turbine blade 22 and a trailing edge 32 of the wind turbine blade 22, depending on air speed, geometry (e.g., angle of attack), or other factors. The leading edge 30 and the trailing edge 32 may extend from a root region 34 of the wind turbine blade 22 including an end 36, at which location the wind turbine blade 22 is secured to the rotor 16, to a tip region 38 including a tip 40 of the wind turbine blade 22. A mid span region 42 extends between the root region 34 and the tip region 38. The end 36 and tip 40 may define a longitudinal axis 44 of the wind turbine blade 22.

In view of the above and with reference now to FIGS. 2 and 3A-3C, in one embodiment, the wind turbine blade 22 may include a surface layer 46 that defines an exterior surface 48 of the wind turbine blade 22 and forms a barrier to the environment thus shielding the regions of different density from the elements. The surface layer 46 may be configured to resist degradation from environmental exposure, but may not measurably enhance the load carrying capability of the wind turbine blade 22. To that end, the surface layer 46 may form the entirety of the exterior surface 48 of the wind turbine blade 22 and may be a uniform, continuous thin film, which may measure only fractions of a millimeter thick (e.g., about 0.5 mm or less). In one embodiment, a slightly thicker surface layer 46 may be applied. By way of example only, the surface layer 46 may be up to about 2 mm thick. By way of further example, thicknesses of about 1.5 mm or less and about 1 mm or less are contemplated. By way of example only, the surface layer 46 may include polyethylene terephthalate (PET) or similar polymer and may optionally include reinforcing fibers. As is described below, in one embodiment, the surface layer 46 may be deposited via a thin veil fabric layer that is laid over a high density outer region.

Figure 3A:
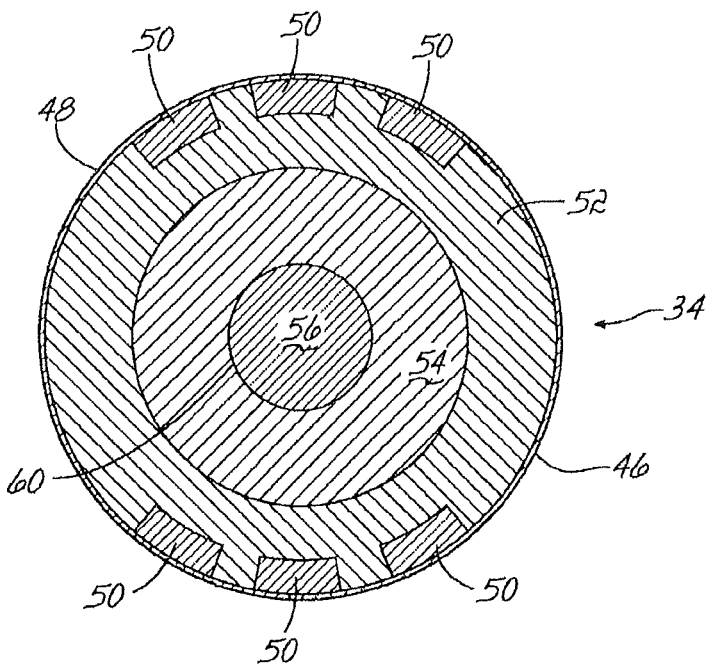
FIGS. 3A, 3B, and 3C are cross-sectional views of the wind turbine blade shown in FIG. 2 taken along section lines 3A-3A, 3B-3B, and 3C-3C, respectively.
Figure 3B:
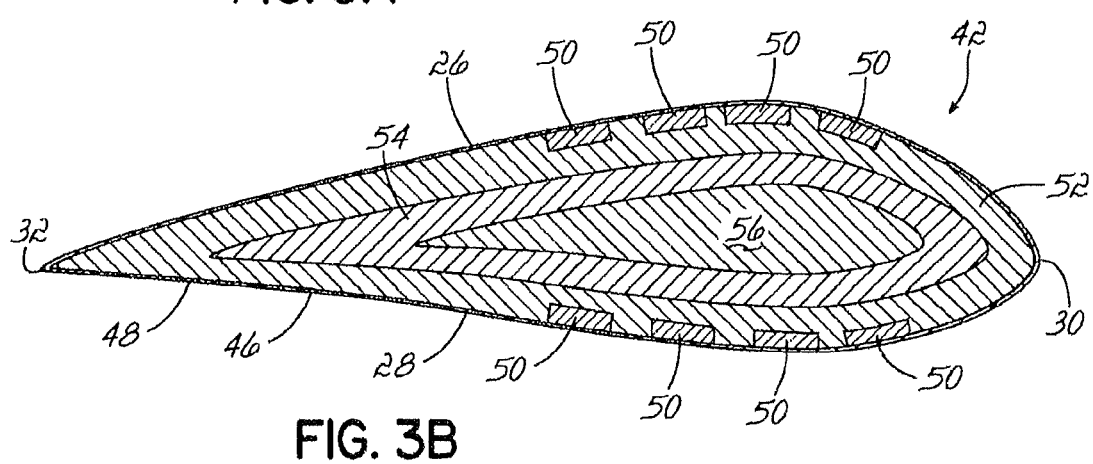
Figure 3C:
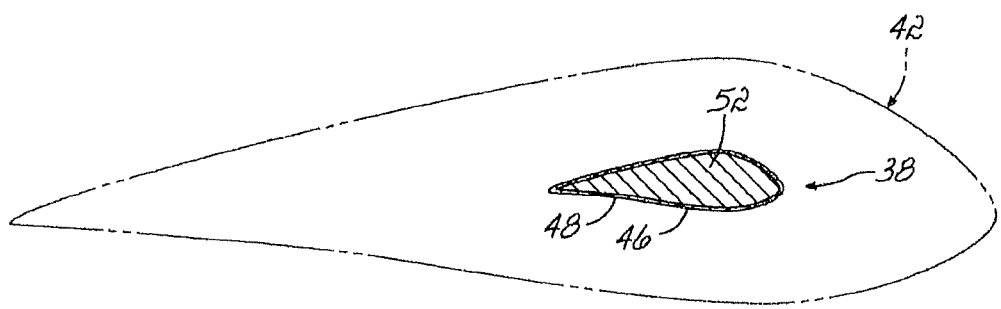
Figure 4:
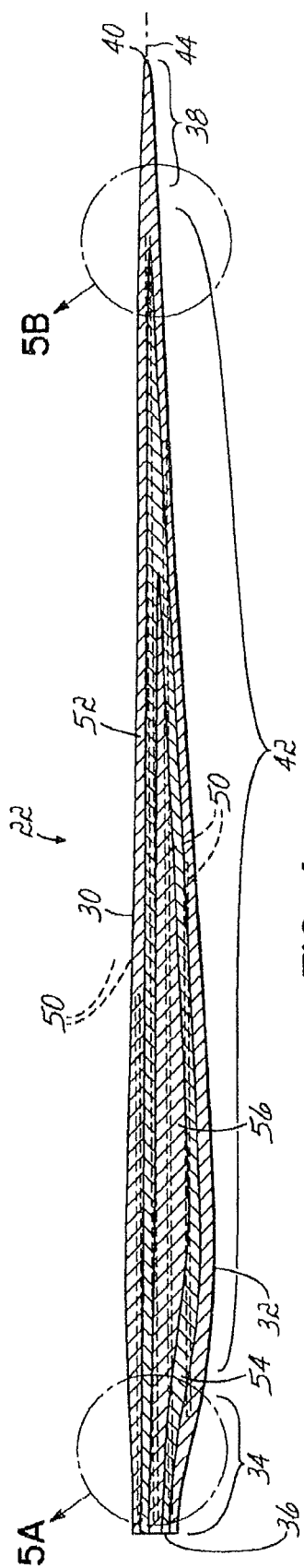
FIG. 4 is a cross-sectional view of the wind turbine blade shown in FIG. 2 taken along an axis generally parallel with a longitudinal axis of the wind turbine blade.

The load on the wind turbine blade 22 is instead borne by the regions of different density (described below) in the lengthwise portions 24, which may be reinforced with one or more structural elements 50 (FIGS. 3A-3C). In particular, in a lengthwise portion 24 defining at least a portion of the root region 34 as shown in FIGS. 3A and 4, the density may vary in a radial direction from a high density region 52 near the exterior surface 48 to a medium density region 54 and then to a low density region 56 that may define a core portion 60 of the wind turbine blade 22. The density is greatest in the high density region 52 and generally decreases through each of the medium density region 54 and the low density region 56 toward the core 60. This variation in density may extend along the lengthwise portion 24, which may extend along the full length of the wind turbine blade 22. This configuration may enhance the load carrying capability of the lengthwise portion 24 of the wind turbine blade 22 while minimizing the weight of that lengthwise portion.

In the exemplary embodiment shown, the high density region 52 may generally define an outermost ring portion of the wind turbine blade 22 in the root region 34. The surface layer 46 conforms to the outer boundary of the high density region 52 and so forms the exterior surface 48 of the wind turbine blade 22. As shown, the high density region 52 is bounded by the surface layer 46 at one boundary and by the medium density region 54 at the opposing boundary. Similarly, the medium density region 54 is bounded by the high density region 52 and the low density region 56.

The medium density region 54 may also have a ring-like appearance. In the exemplary embodiment shown, the low density region 56 may also be a layered or ring-like structure that defines or surrounds the core 60. This ring-on-ring structure may have a bull's-eye appearance. However, embodiments of the invention are not limited to a layered, concentric ring configuration such as that shown. For example, any single one or all of the regions 52, 54, 56 may be non-symmetrical with respect to the surface layer 46 and with respect to one another. The regions 52, 54, 56 may be shaped to account for a particular distribution of stresses on the wind turbine blade 22.

As described above, the cross sections of the lengthwise portion 24 taken perpendicular to the longitudinal axis 44 may have a bone-like density variation with a decrease in density in a radial direction from the surface layer 46 toward the core 60. With reference to FIG. 3A, by way of example only and not limitation, the high density region 52 may approach 100% density with 5% or less void space (described above with regard to the honeycomb structure and pore structure), which may be filled with a gas, such as air. The medium density region 54 may be less dense than the high density region 52 with a density of at least about 50% with the balance of the volume being void space with the same composition as that of the high density region 52. The low density region 56 may be less than 50% dense with densities as low as 5% contemplated with the balance of the volume being void space of the same composition as the high density region 52 and/or the medium density region 54.

In one embodiment, each of the regions 52, 54, 56 is about one third the width of the radius of the root region 34, though embodiments of the invention are not limited to equally proportioned regions. In the embodiment shown, each of the regions 52, 54, 56 is substantially thicker than the thickness of the surface layer 46. By way of example only, any single one of the regions 52, 54, 56 may be at least 100 times the thickness of the skin layer 46. Further, the relative thicknesses of the regions 52, 54, 56 may vary along the length of the lengthwise portion 24. For example, one or two of the regions 52, 54, 56 may have a greater thickness in the root region 34 than in the tip region 38. Alternatively, portions of the wind turbine blade 22 may include a cavity at or near the core 60. The cavity at or near the core 60 may extend along the full length or lesser length of the lengthwise portion 24. In this case, and by way of example, one or both of the low density region 56 and the medium density region 54 may be absent at that portion of the wind turbine blade 22 to define a centralized cavity. As another example, the aggregate thicknesses of each of the regions 52, 54, 56 may be reduced to leave a centralized cavity at or near the core 60 of the lengthwise portion 24. In other words, embodiments of the invention are not limited to elimination of one of the regions 52, 54, 56 to define a cavity. Rather, cross sections of the lengthwise portion 24 may include each of the regions 52, 54, 56 where at least a portion of the low density region defines a centralized cavity. The description of the variation of the different regions of density is not intended to be limiting in any way. For example, the variation in density may vary gradually across the cross section rather than having well defined boundaries, as shown. This may be applicable for variation in the density by control of the pore structure, described above. For example, while the number of pores per unit volume of material remains constant, the pore size may be gradually increased from the exterior surface 48 toward the core 60.

Figure 5B:
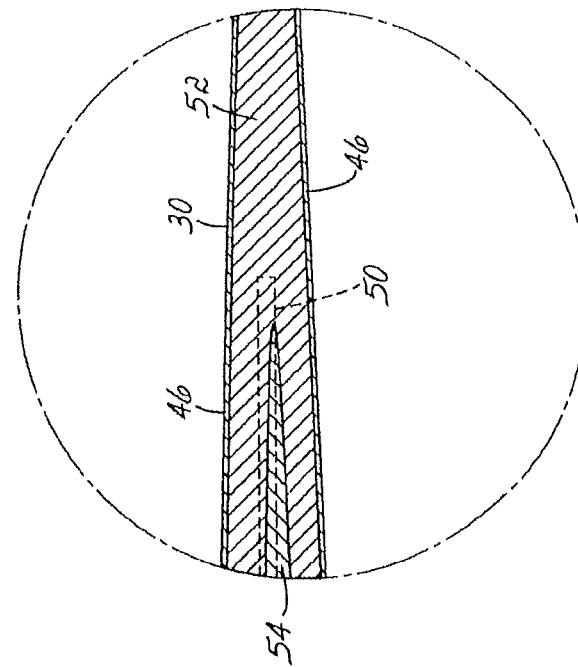
FIG. 5B is an enlarged view of the encircled area 5B of FIG. 4.
Figure 5A:
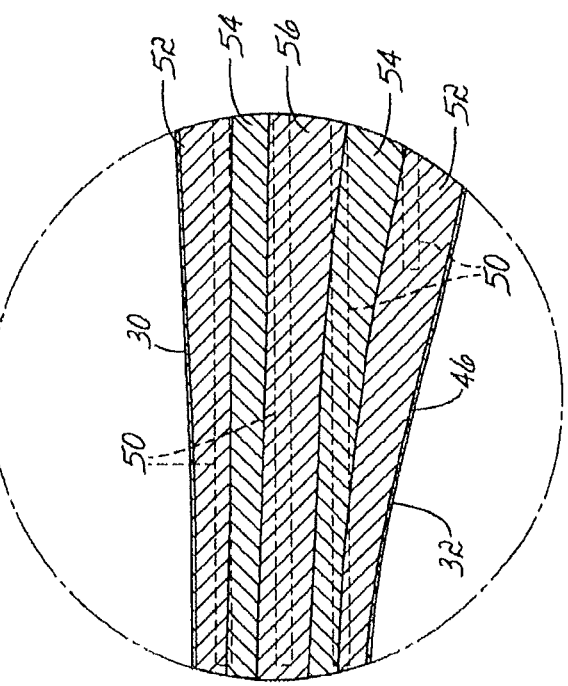
FIG. 5A is an enlarged view of the encircled area 5A of FIG. 4.

With reference to FIGS. 3A and 5A, in one embodiment, the structural elements 50 enhance the load carrying capability of the wind turbine blade 22 during use of the wind turbine 10. To that end, the structural elements 50 are embedded at or near the exterior surface 48 and may extend longitudinally the entire length of the wind turbine blade 22. Specifically, with reference to FIGS. 4, 5A, and 5B, in one embodiment, the structural elements 50 may extend from within the root region 34, through the mid span region 42, and into or near the tip region 38. The structural elements 50 may be bounded by the surface layer 46 along the entire length of the wind turbine blade 22. As shown, embodiments of the invention lack a shear web that extends between the suction surface 26 and pressure surface 28 as is typical with conventional wind turbine blades. In combination with the regions 52, 54, 56, the structural elements 50 carry the majority of the load of gravity, load of wind, and other dynamic loads during use of the wind turbine blade 22.

The structural elements 50 may be positioned between the high density region 52 and the surface layer 46. As shown in FIGS. 3A and 3B, in one embodiment, the structural elements 50 may be embedded within the high density region 52 with the surface layer 46 covering one side of the structural elements 50. The high density region 52 may be deposited, as described below, to conform to the structural elements 50 along a majority of the periphery of the structural elements 50 (i.e., along three sides) with a smaller portion (i.e., the remaining side) of the structural elements 50 being in contact with and covered by the surface layer 46. As is described below, the high density region 52 may be built around the structural elements 50 or recesses may be built into the high density region 52 and the structural elements 50 later inserted into those recesses. Stated in another way, the structural elements 50 may not be deposited during the layering process utilized to manufacture one or more of the high density region 52, the medium density region 54, and the low density region 56. In one embodiment, the structural elements 50 are separate structural components that are prefabricated separately from the regions 52, 54, 56 and then added to the lengthwise portion of the wind turbine blade 22 prior to or following manufacturing of those regions.

Although not shown, the structural elements 50 may be fully embedded within the high density region 52 such that the high density region 52 surrounds each of the elements 50. Embodiments of the present invention are not limited to the structural elements 50 extending through the high density region 52. In addition or as an alternative, the structural elements 50 may extend through the medium density region 54 and even the low density region 56 along the length of the wind turbine blade 22.

While six structural elements 50 are shown in FIG. 3A, for example, it will be appreciated that the number of structural elements 50 is not limited to six, as more or fewer structural elements 50 may be incorporated in the wind turbine blade 22. For example, there may be eight structural elements 50 in the mid span region 42, as is shown in FIG. 3B, and in the tip region 38, there may only be a single structural element 50, as is shown in FIG. 5B. Additional elements 50 may be positioned around the circumference of the high density region 52 and/or additional structural elements 50 may also be positioned within the medium density region 54.

Structural elements 50 may be a material that has a higher elastic modulus (i.e., is stiffer) than the material of each of the high density region 52, the medium density region 54, and the low density region 56. By way of example only, and not limitation, the structural elements 50 may be pultruded fibers (e.g., pultruded glass and/or carbon fibers). While rectangular shaped structural elements 50 are shown, it will be appreciated that the structural elements 50 are not limited to any specific shape, for example, the structural elements 50 may have a rod shape.

With reference to FIGS. 3B, 4, and 5A, the cross section of the wind turbine blade 22 in the mid span region 42 may have an airfoil shape sufficient to produce lift between the suction surface 26 and the pressure surface 28. To that end, the high density region 52 defines an airfoil shape with the surface layer 46 enclosing the high density region 52. Each of the medium density region 54 and the low density region 56 may be similar in shape to the shape of high density region 52 and so may be concentrically formed with the high density region 52. However, the shapes of the medium density region 54 and the low density region 56 may be unrelated to the shape of the high density region 52. For example, with the high density region 52 being airfoil shape, one or both of the medium density region 54 and low density region 56 may have circular shapes.

The variation in density in the mid span region 42 may be similar to the density variation in the root region 34 proximate the end 36 as shown in FIG. 3A and so may be a continuation of that general variation. Specifically, in the mid span region 42 of the wind turbine blade 22, the high density region 52 may generally form a continuous circumferential ring and so define the outermost portion of the airfoil shape of the wind turbine blade 22. The surface layer 46 conforms to the high density region 52 and separates the high density region 52 from the surrounding air.

With reference to FIG. 3B, the cross section through the mid span region 42 may have a bone-like density variation with a gradual decrease in density from the exterior surface 48 toward the core 60, which may surround a centroid of the cross-sectional shape, similar to the density variation shown in FIG. 3A and described above. By way of example only and not limitation, the high density region 52 may approach 100% density with 5% or less of void space, which may be filled with a gas, such as air. The medium density region 54 may be less dense than the high density region 52 with a density of at least about 50% with the balance of the volume being void space with the same composition as that of the high density region 52. The low density region 56 may be less than 50% dense with densities as low as 5% contemplated with the balance of the volume being void space of the same composition as the high density region 52. In one embodiment, each of the regions 52, 54, 56 is about ⅓ the thickness of the mid span region 42, the thickness being taken as the maximum perpendicular distance between the suction surface 26 and the pressure surface 28. Embodiments of the invention are not however limited to equally proportioned regions. Alternatively, portions of the wind turbine blade 22 may include a cavity at or near the core 60. In this case, one or both of the low density region 56 and the medium density region 54 may be absent at that portion of the wind turbine blade 22.

As with the structural elements 50 shown in FIG. 3A, in the mid span region 42 and with reference to FIG. 3B, the structural elements 50 are embedded in the high density region 52 at or near the surface layer 46. The structural elements 50 may be located adjacent the suction side 26 and pressure side 28 between the leading edge 30 and trailing edge 32 of the airfoil. In this regard, the structural elements

50 may act in a manner similar to conventional spar caps, which may be absent from embodiments of the present invention.

With reference to FIGS. 3C, 4, and 5B, the high density region 52 may occupy 100% of the cross section of the tip region 38, as shown. It will be appreciated that other cross sections closer to the mid span region 42 of the wind turbine blade 22 may include both the medium density region 54 and/or the low density region 56, as can be appreciated by FIG. 5B. In that regard, a cross section through the tip region 38 may have a bone-like density variation with a gradual decrease in density in a radial direction from the exterior surface 48 toward the core 60 similar to the density variation shown in FIGS. 3A and 3B described above. The high density region 52 may approach 100% density with 5% or less of void space. However, as the tip 40 is approached, the portion of the cross section including the medium density region 54 and the low density region 56 may be reduced. At a predetermined location, the high density region 52 may form the bulk of the tip region 38 (as shown in FIG. 3C) with the surface layer 46 forming the exterior surface 48 of the wind turbine blade 22. With reference to FIG. 5B, in one embodiment, one or more structural elements 50 may extend into the tip region 38.

As introduced above and with reference to FIG. 4, a single lengthwise portion 24 may extend through each region 34, 38, and 42, for example, from the root end 36 to the tip 40. In the embodiment shown, density varies radially inward from the exterior surface 48 toward the core 60 along the entire length of the wind turbine blade 22 from the end 36 to the tip 40. Although not shown, it will be appreciated that any single one of the root region 34, the tip region 38, and mid span region 42 may include a single lengthwise portion in which the density varies radially as described above. The remainder of the wind turbine blade may be manufactured in a conventional manner. Lengthwise portions 24 made according to embodiments of the present invention with varying radial density may then be joined together with lengthwise portions made according to conventional techniques to form the wind turbine blade 22.

Figure 6:
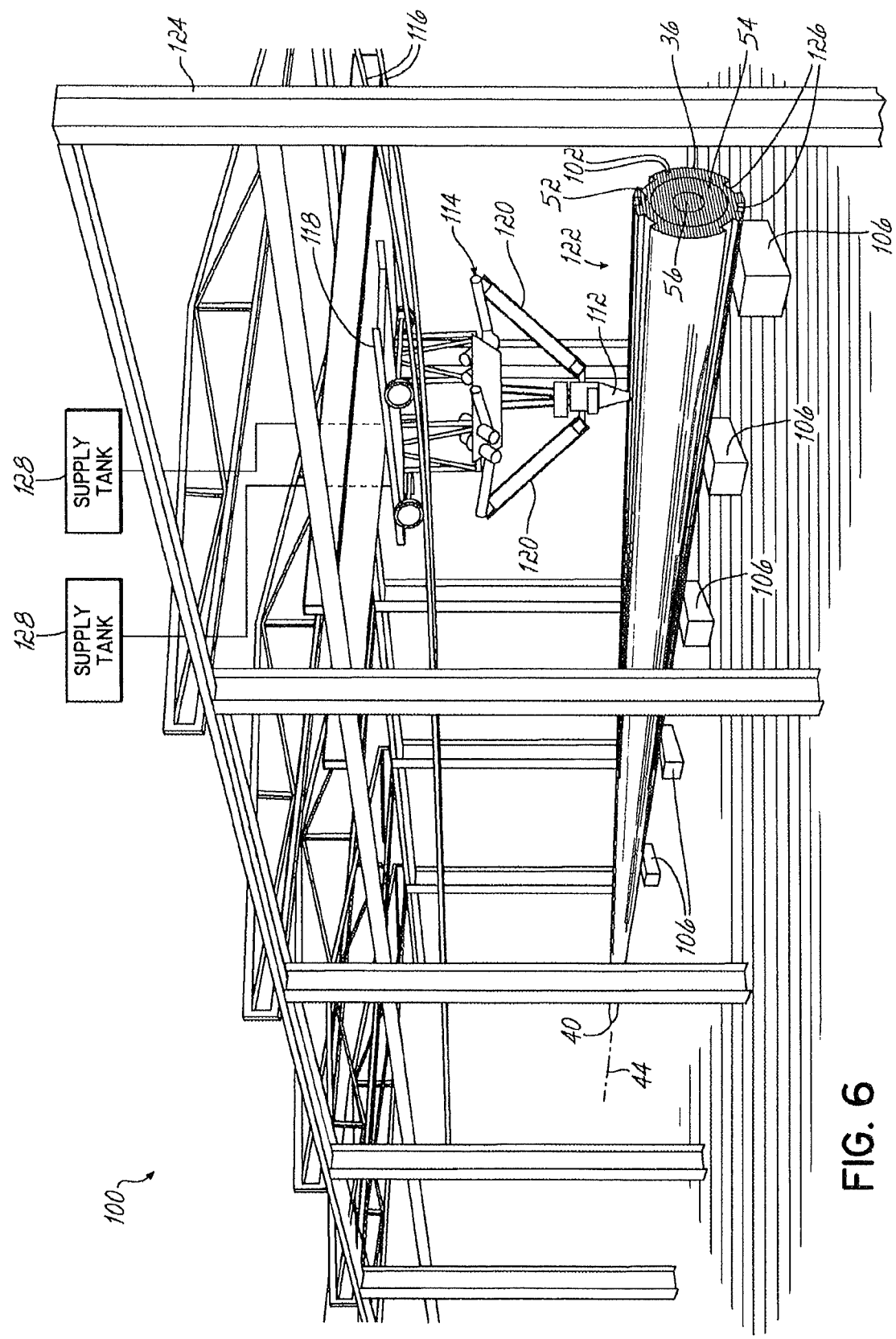
FIG. 6 is a perspective view of a system for manufacturing wind turbine blades according to one embodiment of the invention.
Figure 7:
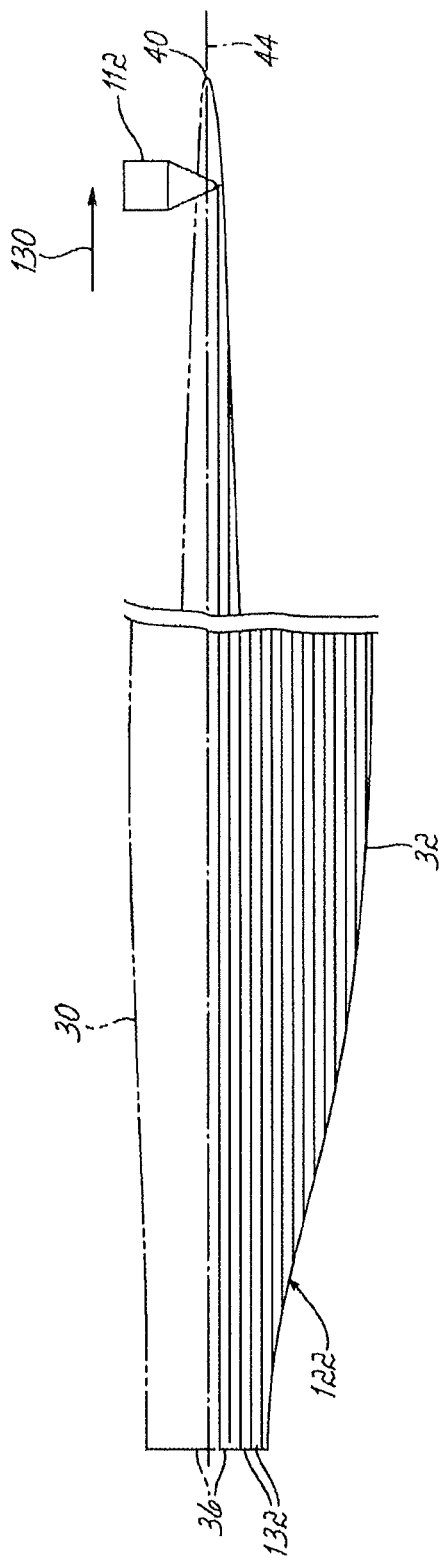
FIG. 7 is a schematic representation of additive manufacturing of a portion of a wind turbine blade in layers according to one embodiment of the invention.
Figure 8:
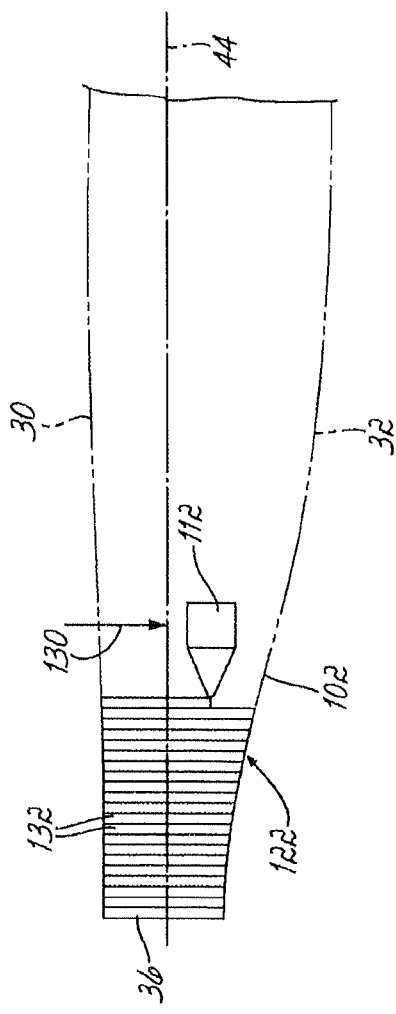
FIG. 8 is a schematic representation of additive manufacturing of a portion of a wind turbine blade in layers according to one embodiment of the invention.

Referring now to FIGS. 6, 7, and 8, in one embodiment, the wind turbine blade 22 may be manufactured with a manufacturing system 100. Although not shown, a digital three-dimensional model of the wind turbine blade 22 may be generated and then that model may be divided into a plurality of digital cross sections, each digital cross section being a discrete layer of the model.

Under computer control, the manufacturing system 100 may deposit material in a layer representing a corresponding layer of the model to build up the wind turbine blade 22 a discrete layer at a time. Depositing material can be by directly depositing layers of material of which the wind turbine blade 22 is made. In particular, the depositing material may include depositing layers from which each of the high density region 52, the medium density region 54, and the low density region 56 is made. Thus, depositing may include building a honeycomb structure or a porous structure in which the volume of void space and volume of material is controlled, as is described above.

In one embodiment, a 3-D printing process is used to produce wind turbine blades, layer by layer, to form a main body 122 having full three-dimensional properties. The wind turbine blade 22 is not produced by assembling separate sections (i.e., from two halves) and so is monolithic in some respects. In one embodiment, at least the main body 122 varies only in density of the material by which the main body 122 is designed to handle loads during use of the wind turbine blade 22. Additive manufacturing processes are particularly useful for wind turbine blades made of materials such as plastics and metals. Wind turbine blades made in this manner may not require extensive machining or may not require any machining. In view of the above, direct 3-D printing processes may eliminate the need to cast custom molds for the wind turbine blade, may eliminate the need to mold the wind turbine blade in two halves for later assembly, and may eliminate the need to machine the wind turbine blade prior to or following assembly of the two halves according to conventional manufacturing techniques.

With reference to FIG. 6, in one such version of the system 100, a print head 112 is set up to print each layer 102. The material is deposited from the print head 112 in uniform layers 102 onto one or more supports 106. During deposition, layers 102 are deposited onto the support 106 to form the main body 122 that ultimately forms a portion of the wind turbine blade 22. The layers 102 are in the shape of a cross section or slice of the model of the wind turbine blade. The slices may be taken in any direction and, by way of example only and not limitation, may be taken generally parallel with the longitudinal axis 44 of the wind turbine blade 22 or generally perpendicular to the longitudinal axis 44, each described below.

With the system 100, the 3-D printing process may produce the high density region 52, the medium density region 54, and the low density region 56 by changing the structure of the material in each of these regions. As described above, this may include intentionally modifying the ratio of the volume of the material to the volume of void space. Thus, the density of the regions 52, 54, and 56, and their portions of the cross section may be adjusted to account for a particular loading on the wind turbine blade 22 while also reducing the weight of the wind turbine blade 22 relative to conventional blades of the same size.

To that end, the system 100 may include a robotic system 114 that is operatively coupled to the print head 112. The robotic system 114 may be capable of moving the print head 112 in at least the three Cartesian coordinate directions (i.e., X-axis, Y-axis, and Z-Axis) according to instructions from a controller (not shown). The print head 112 deposits each layer from the digital model by translating in each of the directions. In that regard, the exemplary robotic system 114 includes cables 116 on which a carriage 118 rides in the x-axis and possibly along the y-axis. The carriage 118 suspends the print head 112 above the supports 106. The cables 116 may be coupled to a frame 124 which supports the robotic system 114 above the supports 106. The cables 116 extend more than the longitudinal length of the wind turbine blade 22 so that the controller may move the carriage 118 the entire length of the wind turbine blade 22 between the end 36 and the tip 40. The carriage 118 has arms 120 that position and reposition the print head 112 in the y- and z-axes above the supports 106. It will be appreciated that for lengths of lengthwise portions 24 that are less than the full length of the wind turbine blade 22, the cables 116 may extend to a lesser length or the carriage 118 may be adjusted to traverse only the length necessary to manufacture the lengthwise portion desired.

With continued reference to FIG. 6, in one embodiment, the system 100 includes one or more supply tanks 128 which are operatively coupled to the print head 112. Supply tanks 128 may contain the raw material necessary to produce each of the layers 102. During deposition, raw material from one or more of the tanks 128 is transferred to the print head 112 and is deposited. In one embodiment, the system 100 initially builds the supports 106. While multiple supports 106 are shown, a single continuous support may be constructed with the system 100 prior to manufacturing the main body 122 on that single support. Alternatively, a support having an underlying shape of the external surface 48 of the blade 22 may be deposited on a generally planar work table (not shown) by 3D printing to thereby form a shaped support on a prefabricated work surface. Advantageously, multiple supports 106 or a single continuous support may be custom made at the installation site and may be reused as needed for that installation or other wind turbine installations.

In addition, in one embodiment, prior to depositing the lengthwise portion 24, a surface film (not shown) may be placed on the supports 106. The film may be a preformed sheet or may be formed by depositing the film on the support 106 with the print head 112. The surface film may form the surface layer 46, described above, or be a release sheet to aid separation of the main body 122 from the support 106.

In addition to placement of a film, one or more structural elements 50 may be positioned on the supports 106 (or on the film) so as to span the supports 106. After the supports 106 are deposited, any film is placed on the supports 106, and/or the structural elements 50 are positioned, the main body 122 may be deposited in layers 102 according to the three-dimensional model. In embodiments in which multiple supports 106 are utilized, placement of the structural elements 50 and/or the film on the supports 106 prior to deposition may aid deposition of the layers 102 by effectively providing support for the layers 102 at locations between the supports 106.

In that regard, raw materials from one or both tanks 128 may then be deposited in layers 102 on the support 106 or on the film to build the main body 122. Each layer 102 may define a slice of each of the regions 52, 54, 56. In that regard, the layers 102 collectively define a honeycomb structure or another structure that encapsulates a predetermined volume of void space, or the layers 102 collectively define a porous structure in which the size and/or number of pores per unit volume of material is dispersed within the material of the region. The density variation from one region to the next may be produced by changing the ratio of the structure to the void space in each layer 102. In the high density region 52, very little to no void space may be encapsulated by each of the honeycombs, for example. In the medium density region 54, the honeycomb structure may be enlarged to capture more void space within each honeycomb and thus reduce the density in the medium density region 54 relative to the high density region 52. Similarly, in the low density region 56, the honeycomb structure may capture an even larger proportion of void space than in the medium density region 54 and thus reduce the density of the low density region 56 relative to the medium density region 54.

As an alternative and depending on the type of additive manufacturing process utilized to construct the main body 122, the deposited layers 102 may initially include raw material that is ultimately removed from the main body 122 once the main body 122 is formed. By way of example only, a first material may be deposited from Tank #1. A second material may be deposited from Tank #2 in the same layer as the first material. The first material may be removed from the main body 122 subsequent to formation of that layer or construction of the main body 122. Removing that material forms void space with the second material providing the structure of the region 52, 54, and 56 and thus provides the density variation within the main body 122. In this way, the remaining, second material forms the structure of the regions 52, 54, 56. As another alternative, two different materials may be deposited simultaneously from one or more print heads in each layer 102 or the two materials may be deposited and then react to form a porous material of the layer 102.

In one embodiment, as is shown in FIG. 6, one or more recesses 126 may be built into the main body 122 during the building process. The structural elements 50 may then be inserted into the recesses 126 once the main body 122 is complete. In this case, the structural elements 50 may be positioned with the robotic system 114 or manually on the supports 106. As described above, the structural elements 50 may be prefabricated components, such as, pultruded rods or bars. The structural elements 50 may be encapsulated by the layers 102 during building of the main body 122. In either case, the layers 102 may be formed to precisely match the structural elements 50 and the curvature of the suction surface 26 and the pressure surface 28 as determined by the three-dimensional model of the wind turbine blade 22. The layers 102 may be produced in a number of orientations relative to the axis 44.

With reference to FIGS. 6 and 7, the direction of the build process is not of particular significance. The layers 102 may be planar in accordance with the digital layers from the 3-D model of the wind turbine blade 22. With reference to FIG. 7, and by way of example only, the print head 112 may be started at the end 36 and translated toward the tip 40 (as is indicated by arrow 130). This movement produces a segment 132 of the layer 102. By depositing consecutive segments 132, the layer 102 of the model of the wind turbine blade is reproduced with variations in the densities as described above in accordance with the digital model. While linear segments 132 are shown, embodiments of the invention are not limited to linear segments, as additive manufacturing may include controlling the print head 112 to trace a nonlinear path during the deposition of one or more of the layers 102. For example, the print head 112 may trace the shape of a honeycomb and so deposit the material of the honeycomb along a nonlinear path.

With reference to FIG. 7, each layer 102 may be built beginning with the trailing edge 32 and ending with the leading edge 30 with the movement of the print head 112 generally parallel with the longitudinal axis 44 to deposit segments 132. Although not shown, once the layer 102 is complete, the print head 112 may begin depositing the next layer starting at the leading edge 30 and depositing a new segment 132 by translating longitudinally between the root end 36 and the tip 40 in the same manner as the previous layer. It will be appreciated that the translation direction of the print head 112 may be reversed from that shown in FIG. 7. In other words, segments 132 may be deposited beginning at the leading edge 30 with successive segments 132 forming the layer 102 toward the trailing edge 32. Or, a combination of the translation directions may be utilized. For example, one segment 132 may be deposited from the end 36 to the tip 40 and the adjacent segment 132 may be deposited in a reverse direction from the tip 40 to the end 36. In either case, the print head moves in a back-and-forth motion between the end 36 and the tip 40.

Alternatively, and with reference to FIG. 8, the print head 112 may be translated transversely relative to the longitudinal axis 44 of the wind turbine blade 22 between the trailing edge 32 and the leading edge 30 to deposit segments 132. This is in contrast with the process generally indicated in FIG. 7 in which the print head 112 translates longitudinally between the end 36 and the tip 40. In FIG. 8, the segments 132 extend from the trailing edge 32 to the leading edge 30. The segments 132 are deposited beginning at the root end 36 and are stacked side-by-side toward the tip 40 during the build process of the layer 102.

In one embodiment, a combination of the process illustrated in FIGS. 7 and 8 may be utilized to build layers 102. For example, one layer 102 may be built from segments 132 extending between end 36 and tip 40 (FIG. 7) and the next layer 102 may be built from segments 132 that extend from the trailing edge 32 to the leading edge 30 (FIG. 8). In either deposition direction, that is in the case of the deposition direction shown in FIG. 7 or FIG. 8, any single one of the layers 102 may be oriented in a plane generally parallel to the axis 44. In other words, the layers 102 extend from the end 36 to the tip 40 rather than being transverse to the axis 44, which may include being perpendicular to the axis 44 (i.e., extending from the suction surface 26 to the pressure surface 28.) The layers 102 collectively define the aerodynamic surfaces 26, 28 and edges 30, 32 of the wind turbine blade 22 onto which the surface layer 46 is formed. In this manner, the print head 112 produces each layer 102 of the wind turbine blade 22.

Once the layers 102 are deposited to complete the main body 122, the main body 122 may be removed from the system 100. Another wind turbine blade may be built from the same model onto the supports 106. If not encased in the main body 122 during the build process, the structural elements 50 may be inserted into the recesses 126 following formation of the main body 122. The surface layer 46 may then be constructed on the main body 122 to encapsulate the main body 122 and the structural elements 50 within a skin of material.

In one embodiment, the layer 46 may be produced by a heat shrinking process. To do so, the main body 122 and the structural elements 50 may be inserted into a large, seamless envelope (e.g., a bag) (not shown) of the material from which the surface layer 46 is to be made. Once the main body 122 is inserted into the envelope, the envelope may be heated within a large oven or with a heat source directed to localized portions of the envelope. The localized source may produce heat sufficient to increase the temperature of the envelope to up to about 100° C. or hotter. Heat sources may include hot water or steam, which may be sprayed onto the envelope or onto the surface of the main body 122. By this process, the envelope may shrink into contact with the main body 122 to produce a seamless surface layer 46. Once encapsulated within the surface layer 46, the wind turbine blade 22 may undergo finishing, which may include sanding and/or painting.

While the system 100 having a single print head 112 is shown, it will be appreciated that additional print heads may be utilized to more quickly produce the main body 122. It will be further appreciated that the system 100 may be constructed at the site at which the wind turbine 10 is to be installed. The system 100 may be transported in separate pieces by, for example, tractor-trailer and then assembled or may be transported via ship to the wind turbine installation site. Advantageously, the system 100 and the necessary materials may be easily transported to the installation site as compared to a wind turbine blade according to conventional (i.e., molding) manufacturing techniques. It will be appreciated that systems having other configurations are possible. As an example, a six-axis robot may be supported on a rail system (not shown) adjacent the supports 106 with a print head mounted on the robotic system. A control system may then control the robot and its position on the rail to deposit layers in a similar manner to that described herein.

While the present invention has been illustrated by a description of various embodiments and while these embodiments have been described in some detail, it is not the intention of the inventor to restrict or in any way limit the scope of the appended claims to such detail. Thus, additional advantages and modifications will readily appear to those of ordinary skill in the art. The various features of the invention may be used alone or in any combination depending on the needs and preferences of the user.

What is claimed is:

1. A wind turbine blade for use on a wind turbine, comprising:
    a main body forming at least a lengthwise portion of the blade, the main body including a plurality of layers such that a cross section of the main body includes a first region of a first density that surrounds a second region having a volume of void space and being of a second density, the first density being greater than the second density due to the volume of void space in the second region;
    at least one recess formed in the first region of the main body;
    a structural element positioned in the at least one recess, wherein the structural element has a stiffness greater than a stiffness of the first region and is configured to reinforce the lengthwise portion of the blade under load during use of the wind turbine; and
    a surface layer that bounds the first region and that forms an exterior surface of the blade.

2. The wind turbine blade according to claim 1, wherein the structural element is bounded by the surface layer.

3. The wind turbine according to claim 1, wherein the structural element is fully embedded within the first region of the main body.

4. The wind turbine blade according to claim 1, wherein the first region and the second region are made from the same material.

5. The wind turbine blade according to claim 1, wherein the structural element is formed from pultruded fibers.

6. The wind turbine blade according to claim 1, wherein the first and/or second density varies along the lengthwise portion of the blade.

7. The wind turbine blade according to claim 1, wherein the cross section of the main body further includes a third region of a third density, wherein the second region surrounds the third region and includes a volume of void space such that the third density is less than the second density.

8. The wind turbine blade according to claim 7, further comprising:
    at least one recess formed in the second region of the main body; and
    a structural element positioned in the at least one recess in the second region.

9. The wind turbine blade according to claim 1, wherein the first region and the second region include a honeycomb structure.

10. The wind turbine blade according to claim 9, wherein the size of the honeycomb structure in the first region is different than the size of the honeycomb structure in the second region.

11. The wind turbine blade according to claim 9, wherein a wall thickness of the honeycomb structure in the first region and the second region is constant.

12. The wind turbine blade according to claim 1, wherein the first region and the second region include a porous structure having a pore size.

13. The wind turbine blade according to claim 12, wherein the pore size in the first region is different than the pore size of the second region.

14. The wind turbine blade according to claim 1, wherein the at least lengthwise portion of the blade includes a full length of the blade.

15. The wind turbine blade according to claim 1, wherein the main body is formed through an additive manufacturing process including computer controlled deposition of individual layers of material based on a computer model.

16. A wind turbine, comprising:
- a tower;
- a nacelle disposed on the tower; and
- a rotor including a hub and at least one wind turbine blade according to claim 1 extending from the hub.

17. A wind turbine blade for use on a wind turbine, comprising:
- a main body forming at least a lengthwise portion of the blade, the main body including a plurality of layers such that a cross section of the main body includes a first region of a first density that surrounds a second region having a volume of void space and being of a second density, the first density being greater than the second density due to the volume of void space in the second region;
- at least one recess formed in the first region of the main body;
- a structural element positioned in the at least one recess, wherein the structural element is configured to reinforce the lengthwise portion of the blade under load during use of the wind turbine; and
- a surface layer that bounds the first region and that forms an exterior surface of the blade,
- wherein the first region and the second region are made from the same material.

18. A wind turbine blade for use on a wind turbine, comprising:
- a main body forming at least a lengthwise portion of the blade, the main body including a plurality of layers such that a cross section of the main body includes a first region of a first density that surrounds a second region having a volume of void space and being of a second density, the first density being greater than the second density due to the volume of void space in the second region;
- at least one recess formed in the first region of the main body;
- a structural element positioned in the at least one recess, wherein the structural element is configured to reinforce the lengthwise portion of the blade under load during use of the wind turbine; and
- a surface layer that bounds the first region and that forms an exterior surface of the blade,
- wherein the structural element is formed from pultruded fibers.

19. A wind turbine blade for use on a wind turbine, comprising:
- a main body forming at least a lengthwise portion of the blade, the main body including a plurality of layers such that a cross section of the main body includes a first region of a first density that surrounds a second region having a volume of void space and being of a second density, the first density being greater than the second density due to the volume of void space in the second region;
- at least one recess formed in the first region of the main body;
- a structural element positioned in the at least one recess, wherein the structural element is configured to reinforce the lengthwise portion of the blade under load during use of the wind turbine; and
- a surface layer that bounds the first region and that forms an exterior surface of the blade,
- wherein the first and/or second density varies along the lengthwise portion of the blade.

20. A wind turbine blade for use on a wind turbine, comprising:
- a main body forming at least a lengthwise portion of the blade, the main body including a plurality of layers such that a cross section of the main body includes a first region of a first density that surrounds a second region having a volume of void space and being of a second density, the first density being greater than the second density due to the volume of void space in the second region;
- at least one recess formed in the first region of the main body;
- a structural element positioned in the at least one recess, wherein the structural element is configured to reinforce the lengthwise portion of the blade under load during use of the wind turbine; and
- a surface layer that bounds the first region and that forms an exterior surface of the blade,
- wherein the cross section of the main body further includes a third region of a third density, wherein the second region surrounds the third region and includes a volume of void space such that the third density is less than the second density.

* * * * *